United States Patent [19]
Gasser

[11] Patent Number: 4,553,658
[45] Date of Patent: * Nov. 19, 1985

[54] APPARATUS FOR DEFLECTING ARTICLES

[75] Inventor: Markus Gasser, Gächlingen, Switzerland

[73] Assignee: SIG Schweizerische Industrie-Gesellschaft, Neuhausen am Rheinfall, Switzerland

[*] Notice: The portion of the term of this patent subsequent to Feb. 19, 2002 has been disclaimed.

[21] Appl. No.: 491,240

[22] Filed: May 3, 1983

[30] Foreign Application Priority Data

May 3, 1982 [CH] Switzerland .......................... 2707/82

[51] Int. Cl.[4] ............................................. B65G 47/46
[52] U.S. Cl. ..................................... 198/369; 198/436
[58] Field of Search ............... 198/435, 436, 592, 812, 198/437, 366, 369, 370, 358

[56] References Cited

U.S. PATENT DOCUMENTS

| | | | |
|---|---|---|---|
| 2,334,384 | 11/1943 | Cohen | 198/369 |
| 3,520,396 | 7/1970 | Lingg | 198/420 |
| 3,930,571 | 1/1976 | Svensson et al. | 198/394 |
| 4,164,277 | 8/1979 | Fluck et al. | 198/369 |
| 4,222,478 | 9/1980 | Gasser | 198/358 |
| 4,281,756 | 8/1981 | Bruno | 198/369 X |
| 4,281,757 | 8/1981 | Morton | 198/812 X |

FOREIGN PATENT DOCUMENTS 558749  5/1973  Switzerland .
647151 12/1950  United Kingdom ................ 198/366

Primary Examiner—Joseph E. Valenza
Assistant Examiner—Jonathan D. Holmes
Attorney, Agent, or Firm—Spencer & Frank

[57] ABSTRACT

An article processing line has a plurality of first conveyors for advancing articles in a direction of conveyance; a plurality of second conveyors adjoining respective first conveyors for advancing articles in the direction of conveyance; a plurality of normally operating processing machines associated with a respective second conveyor for receiving articles therefrom; a standby conveyor mechanism situated underneath the second conveyors; a standby processing machine associated with the standby conveyor mechanism for receiving articles therefrom; and a plurality of deflector conveyor belts adjoining respective first conveyors. Each deflector conveyor belt is pivotal in a vertical plane to assume an upper position and a lower position. In the lower position the deflector conveyor belt is operatively connected with the standby conveyor mechanism for receiving articles from the respective first conveyor and transferring articles to the standby conveyor mechanism.

4 Claims, 7 Drawing Figures

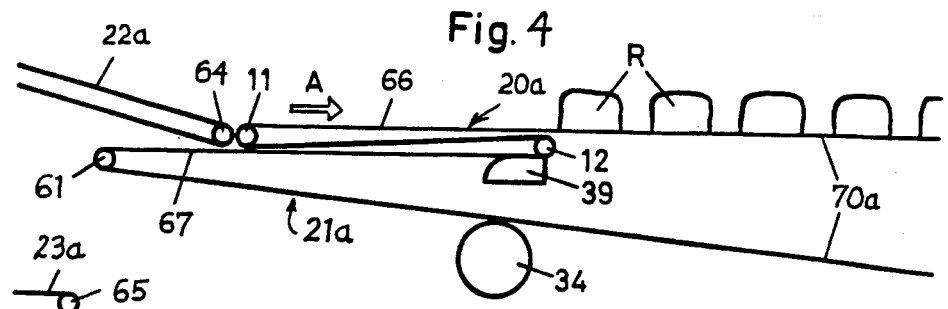
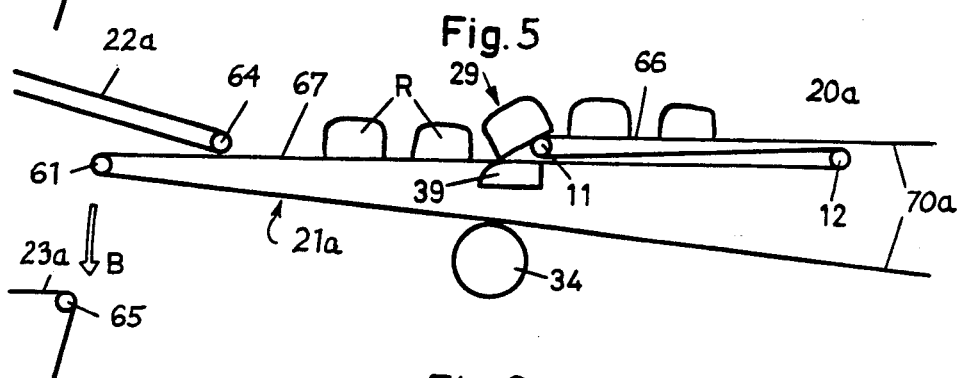
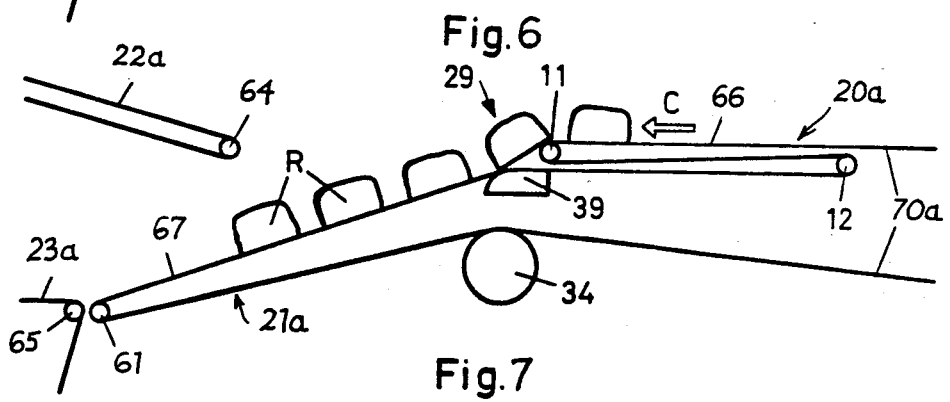
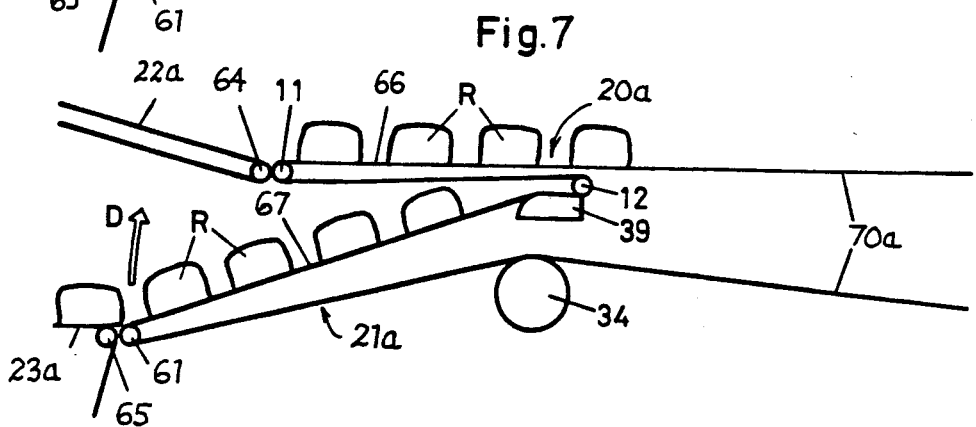

APPARATUS FOR DEFLECTING ARTICLES

BACKGROUND OF THE INVENTION

This invention relates to an apparatus for deflecting (detouring) at least one of several article streams advanced in a processing line. The deflected article stream is directed to an accumulating conveyor track and/or to a standby machine which is not in use during normal operation. The processing line has at least two parallel-supplied processing machines to which the articles are advanced from an article delivery station by means of separate conveyor tracks each provided with a rotary aligning device.

U.S. Pat. No. 4,222,478 discloses a system in which, during normal operation, simultaneously several machines work parallel and receive in sequence uniformly spaced articles. With the normally operating machines there is associated a reserve or standby machine which, when one of the normally operating machines is inoperative, takes over the function thereof. With each normally operating machine there is associated an aligning apparatus which comprises a rotary table and a stationary guide rail. On the rotary table deflecting means are provided with which the articles are deflected to a conveyor which advances the articles to the standby machine. The articles are thus taken in a single file and, because of their small density, the conveyor can function only in a limited manner as an accumulator.

Further, as known, the conveying speed has to be greater downstream of the aligning apparatus than upstream thereof and, as a result, the articles arrive with the higher conveying speed on the conveyor which advances them to the standby machine.

SUMMARY OF THE INVENTION

It is an object of the invention to provide an improved apparatus in which the articles, prior to forming a single file, are guided without transverse acceleration to a standby machine in case of a standstill of a normally operating machine, while primary consideration is given to the gentle handling of the articles. It is a further object of the invention to provide an improved apparatus for feeding the articles to the standby machine either immediately after the articles are deflected or after they have been gathered by an accumulating conveyor.

These objects and others to become apparent as the specification progresses, are accomplished by the invention, according to which, briefly stated, the articles are directed from the conveyor track by means of deflector belts to an accumulator belt associated with a standby processing machine or directly to a standby processing machine which is in readiness for all the delivery stations.

BRIEF DESCRIPTION OF THE DRAWING

FIGS. 4, 5, 6 and 7 are schematic side elevational views of one part of the structure shown in FIG. 3, depicting different operational phases.

DESCRIPTION OF THE PREFERRED EMBODIMENT

Figure 1:
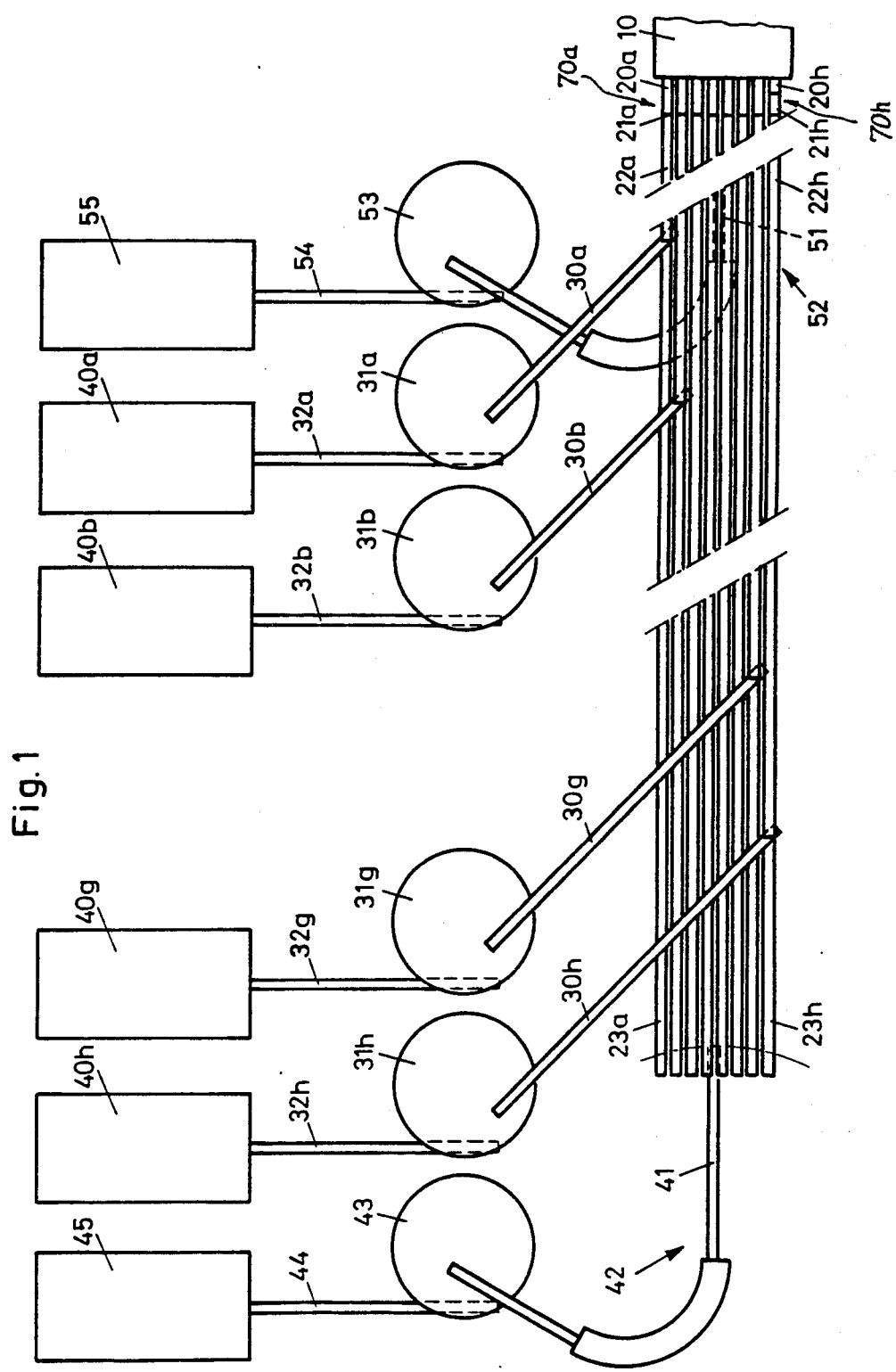
FIG. 1 is a schematic top plan view of a preferred embodiment of the invention.
Figure 2:
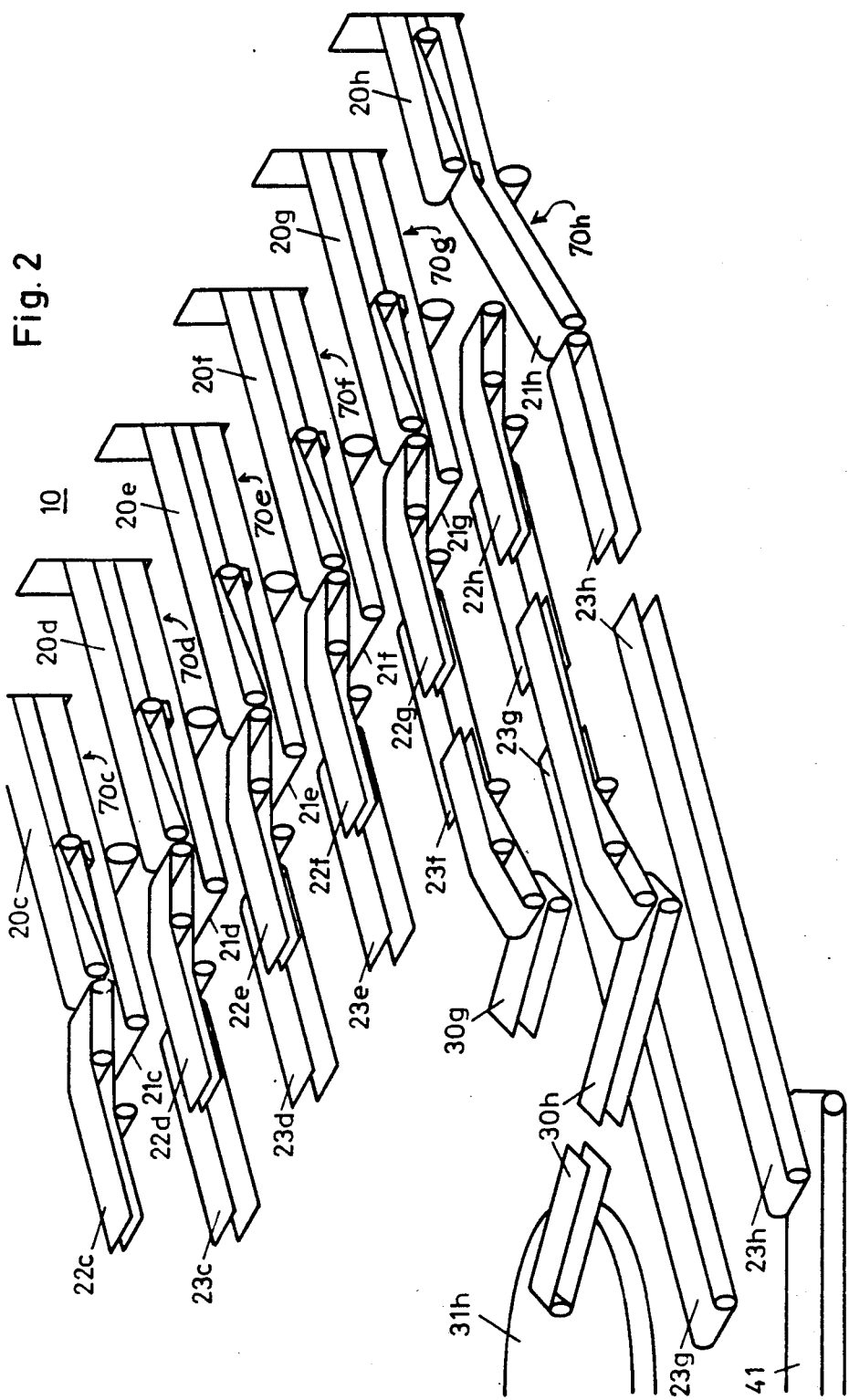
FIG. 2 is a perspective view of details of FIG. 1.

In FIGS. 1 and 2, machine frame components as well as electric feeding devices or controls are not shown or described because such components are well known in the packaging art and because such components have no direct bearing on the invention.

Turning to FIG. 1, articles, for example, chocolate bars which are to be individually wrapped in packaging machines, are manufactured in a production machine (not shown), are discharged at random and are admitted to a row aligning apparatus 10. The latter arranged the articles on eight parallel individual conveyor belts 20a through 20h on which the articles are conveyed from right to left as viewed in FIG. 1. From the individual conveyor belts 20a through 20h the articles are admitted in a manner to be described below, to inlet conveyor belts 30a through 30h and therefrom to rotary aligning machines 31a through 31h which may be structured as disclosed, for example, in U.S. Pat. No. 3,930,571. By means of the aligning apparatus 31a through 31h the articles are aligned and transferred with a uniform spacing and in single file to the outlet belts 32a through 32h. From the outlet belts 32a through 32h the articles are admitted to simultaneously operating packaging machines 40a through 40h. Such packaging machines are known in great variety and are therefore not illustrated or described in detail.

Also referring now to FIG. 2, the conveyor belts 20a through 20h extending from the row aligning apparatus 10 continue as deflector belt portions 21a through 21h. As seen, the belts 20a-20h and the respective deflector belt portions 21a-21h are parts of single endless conveyor belts generally indicated at 70a through 70h. From the conveyors 70a through 70h (which thus include the deflector belts 21a-21h respectively) the conveyor track is divided into alternative conveyors, namely conveyor belts 22a through 22h on the one hand and respective accumulator belts 23a through 23h, on the other hand. The conveyor belts 22a through 22h are arranged to transfer articles directly to aligner inlet belts 30a through 30h, feeding the respective rotary table aligners 31a through 31h. The conveyor belts 20a-20h with their respective deflector belt portion 21a-21h will be described later in more detail with reference to FIGS. 3-7.

The accumulating conveyor belts 23a through 23h have respective discharge ends from which the articles may be transferred onto a swingable conveyor belt 41 which forms part of a collecting deflector 42 and which may be aligned selectively with any of the discharge ends of the accumulating conveyor belts 23a through 23h.

While the rotary aligning devices 31a through 31h feed aligned articles by means of aligner outlet belts 32a through 32h to respective, normally operating processing (for example, packaging) machines 40a through 40h, a standby rotary aligner 43 which is supplied by the collecting deflector 42, feeds articles to a standby machine 45 by means of the aligner outlet conveyor belt 44.

During normal operation, the discharge ends of the conveyors 20a through 20h transfer the articles directly to the respective conveyors 22a through 22h to thus feed, as described above, the normally operating processing machines 40a through 40h.

If any of the normally operating processing machines 40a through 40h is out of order, the discharge end of the respective conveyor 20a through 20h is withdrawn in the direction of the row aligner 10 so that such discharge end is transferring articles not onto the respective conveyor 22a through 22h but onto the respective deflector belt 21a through 21h. The latter are pivoted downwardly and then, from their discharge end, the articles are directly transferred to the respective accumulating conveyor belt 23a through 23h to thus feed the swingable belt 41.

FIG. 2 depicts the operational condition in which the normally operating processing machines 40a through 40g function as required and thus the discharge ends of the conveyors 20a through 20g directly transfer articles to the conveyor belts 22a through 22g. The normally operating processing machine 40h, however, is at a standstill, for which reason the conveyor 20h, together with its deflector belt 21h is so set that articles from the conveyor 20h are transferred to the deflector belt 21h from which the articles continue their travel on the accumulating conveyor belt 23h towards the swingable belt 41. The latter is aligned with the discharge end of the accumulating conveyor 23h to receive articles therefrom and forward them, with the intermediary of the rotary aligning device 43 and the aligner outlet belt 44 to the standby machine 45 which, at this time, operates and assumes the function of the nonoperating processing machine 40h.

Reverting once again to FIG. 1, immediately downstream of the row aligning apparatus 10 there is arranged an additional collecting deflector 52 having a swingable conveyor belt 51 disposed underneath the conveyor belts 20a-20h. The additional collecting deflector 52 supplies with articles a standby rotary aligner 53 which, in turn, feeds a standby packing machine 55 with the intermediary of an aligner outlet belt 54.

When the additional collecting deflector 52 is used, it is feasible to dispense with the accumulating belts 23a-23h. Stated differently, the arrangement may be designed in a modular manner in which first the standby machine is placed, with a collecting deflector, directly at the deflector belts 21a-21h and is only later arranged at a distance from the deflector belts 21a-21h with the aid of the accumulating conveyors 23a-23h. The described arrangement is particularly advantageous for such a subsequent complementation because the accumulating belts 23a-23h are situated underneath the conveyor tracks 22a-22h so that no additional space is required for the accumulating belts.

As opposed to known arrangements in which articles are conveyed transversely, as described, for example, in Swiss Pat. No. 558,749, according to the invention, the articles, upon transfer onto the accumulating belt are not displaced in a direction that is different from the main conveying direction; rather, the separation is effected while the direction of advance (longitudinal direction or main conveying direction) remains the same. By arranging all deflector belts 21a-21h side-by-side, there is obtained the greatest possible accumulating path up to the standby machine 45 and for all processing (packaging) machines 40a-40h the same accumulating capacity is available. The fact that transfer onto the accumulating belts 23a-23h occurs upstream of the rotary aligners 31a-31h, that is, before the articles are aligned into a single file, makes possible a further increase in the accumulation capacity.

In the description which follows, the structure and operation of the conveyor belts 20a-20h, together with their respective deflector belts 21a-21h will be set forth with reference to a single assembly 20a, 21a and in conjunction with FIGS. 3-7.

Figure 3:
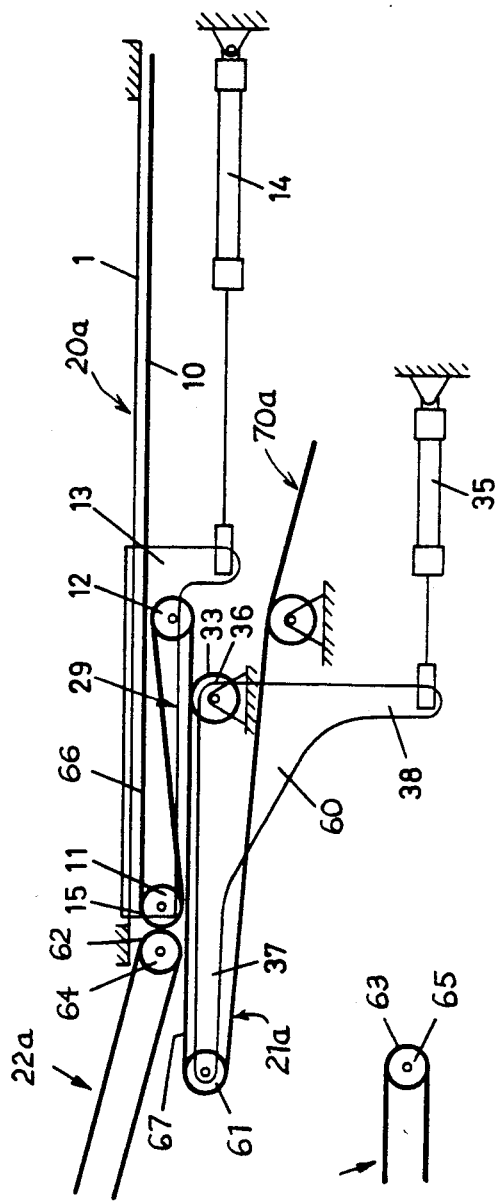
FIG. 3 is schematic side elevational view of a device incorporated in the preferred embodiment of the invention.

Turning now to FIG. 3, on a stationary machine frame 1 there is mounted a carriage 13 which supports two belt deflecting rollers 11 and 12 and which is horizontally displaceable by a power cylinder (pneumatic cylinder) 14. A bell crank lever 60 is pivotally supported at 36 and carries at one end of one of its legs 37 a further deflecting roller 61. To the end of a second leg 38 of the bell crank lever 60 there is connected a further power cylinder (pneumatic cylinder) 35. FIG. 3 further shows the discharge (downstream) portion of the conveyor 70a consecutively trained about deflecting rollers 11, 12 and 61.

The charging (upstream) ends 62 and 63 of the conveyor 22a and the accumulating conveyor 23a, respectively, are trained about respective end rollers 64 and 65. The end rollers 64 and 65 are vertically offset in the direction of conveyance; the deflecting roller 61 at the end of the leg 37 is arranged below the deflecting roller 64 of the delivery belt 22a such that upon pivoting the bell crank lever 60 into a lower end position, the deflecting roller 61 is almost in engagement with the upstream end 63 of the lower accumulating belt 23a.

In the description which follows, the operation of the above-described assembly 20a, 21a will be set forth with particular reference to FIGS. 4 to 7.

In the normal operation as shown in FIG. 4, the articles R such as chocolate bars are conveyed from right to left on the upper reach 66 of the supply conveyor belt 70a and at the downstream or discharge end thereof the articles are transferred onto the charging (upstream) end 62 of the delivery conveyor belt 22a.

In case of an operational disturbance involving the delivery conveyor belt 22a, such as, for example, a stoppage of the packaging machine 40a normally supplied by the conveyor belt 22a, the pneumatic cylinder 14 is actuated whereupon the carriage 13 moves, with the two deflecting rollers 11 and 12, in the direction of the arrow A towards the right until the rollers 11 and 12 assume a position shown in FIG. 5. As a result, the articles R are now transferred over the frontal deflecting roller 11 onto the lower reach 67 of the conveyor 70a. It is noted that the upper reach 66 of the conveyor belt 70a forms part of the conveyor 20a and the lower reach 67 of the conveyor belt 70a forms part of the deflector belt 21a. As the carriage 13 reaches its end position during the rightward travel, a switch is automatically actuated whereupon the pneumatic cylinder 35 is energized for pivoting the bell crank lever 60 counterclockwise about its pivot at 36 (FIG. 3) in the direction of the arrow B (FIG. 5). By means of the additional effective path length on the lower reach 67 an additional conveyor length is provided on which the articles R are advanced during the pivotal motion of the bell crank lever 60.

Upon reaching the lower end position as shown in FIG. 6, the accumulating conveyor belt 23a is started and the articles R are thus admitted from the lower reach 67 of the supply conveyor belt 70a to the accumulating belt 23a.

As soon as the operational disturbance that has involved the conveyor belt 22a is eliminated, the carriage 13 is displaced towards the left in the direction of the arrow C as shown in FIG. 6, until the discharge (downstream) end 15 of the upper reach 66 of the supply conveyor belt 70a is positioned at the charging (upstream) end 62 of the conveyor belt 22a. Upon reaching this position, the conveyor belt 22a is restarted. Since the speed of the carriage 13 in the direction of the arrow C is chosen to be greater than the conveying speed of the supply conveyor belt 70a, upon encounter of the two ends 15 and 62 (FIG. 3) a danger of jamming of an article R between the two ends is securely eliminated. The frontal discharge end 15 of the upper reach 66 cannot collide with the articles R situated on the lower reach 67 of the supply conveyor belt 70a because the articles R on the downwardly oriented lower reach 67 are rapidly moved away from the transfer zone between the upper reach 66 and the lower reach 67.

After a certain period of time which should be sufficient for all articles R to be transferred from the lower reach 67 onto the accumulating conveyor belt 23a, the bell crank lever 60 is, as indicated by the arrow D of FIG. 7, pivoted upwardly so that the spatial and operational relationships shown in FIG. 4 are reestablished.

At the zone of transfer 29 a roller 33 is arranged, whose axis may simultaneously form the pivotal axis of the bell crank lever 60, as illustrated in FIG. 3. Since the pivotal angle of the bell crank lever 60 is only about 15°, it is feasible to replace the roller 33 with a slide block 39 supporting the belt 70a as shown in FIGS. 3–7. There is further provided a deflecting roller 34 to generate a location of deflection in the belt 70a upon downward pivotal motion of the deflecting belt portion 21a.

The various switching operations such as the pivotal motion triggered by the carriage 13 reaching its end position, the starting of the accumulating conveyor belt 23a after the bell crank lever 60 has reached its downwardly pivoted position and the starting of the delivery conveyor belt 22a after the upper reach 66 has attained its frontal end position may be effected in a known manner pneumatically and automatically, because the shown positions represent in each instance the various end positions of the two pneumatic cylinders 14 and 35. As an alternative, it is feasible to use known electric limit switches which are actuated by the various positions of the carriage 13 and/or the bell crank lever 60.

It will be understood that the above description of the present invention is susceptible to various modifications, changes and adaptations, and the same are intended to be comprehended within the meaning and range of equivalents of the appended claims.

What is claimed is:

1. An article processing line comprising:
   (a) a plurality of continuously moving first conveyor means each having a discharge end and a first direction of conveyance; said discharge end having an advanced first position and a withdrawn second position; means for moving said discharge end of each said first conveyor means into and out of said first and second positions;
   (b) a plurality of second conveyor means each having an inlet end and a second direction of conveyance; the inlet end of each of said second conveyor means being in a zone of the discharge end of an associated separate, single one of said first conveyor means; said first and second directions of conveyance of each associated said first and second conveyor means being substantially parallel to a common vertical plane; in said first position of the discharge end of any selected one of said first conveyor means the inlet end of the associated second conveyor means adjoins the discharge end of the selected first conveyor means for receiving articles directly therefrom; in said second position of the discharge end of any selected one of said first conveyor means the inlet end of the associated second conveyor means is operatively disconnected from the discharge end of the selected first conveyor means;
   (c) a plurality of normally operating processing machines each associated with a respective second conveyor means for receiving articles therefrom;
   (d) standby conveyor means situated underneath said second conveyor means for cooperating with each said first conveyor means;
   (e) a standby processing machine associated with said standby conveyor means for receiving articles therefrom; and
   (f) each said first conveyor means including a deflector conveyor portion adjacent the discharge end of each respective first conveyor means; each deflector conveyor portion being pivotal in a vertical plane to assume an upper position and a lower position; and means for pivoting each deflector conveyor portion into and out of said upper and lower positions; in said lower position the deflector conveyor portion being operatively connected with said standby conveyor means for receiving articles from the discharge end of the respective first conveyor means which has been moved to said second, withdrawn position and transferring articles to said standby conveyor means; in said upper position the deflector portion being inoperative relative to said standby conveyor means.

2. An article processing line as defined in claim 1, wherein said standby conveyor means comprises a plurality of accumulating conveyor belts adjoining respective deflector conveyor belts and situated underneath respective second conveyor means.

3. An article processing line as defined in claim 2, wherein said standby conveyor means further comprises a collector conveyor belt for advancing articles to said standby machine, said collector conveyor belt being arranged for swinging motion in a generally horizontal plane for alignment with a selected said accumulating conveyor belt for receiving articles from the selected accumulating conveyor belt.

4. An article processing line as defined in claim 1, wherein said standby conveyor means further comprises a collector conveyor belt for advancing articles to said standby machine, said collector conveyor belt being arranged for swinging motion in a generally horizontal plane for alignment with a selective said deflector conveyor portion for receiving articles from the selected deflector conveyor portion.

* * * * *